(12) United States Patent
Oda

(10) Patent No.: US 12,548,598 B2
(45) Date of Patent: Feb. 10, 2026

(54) INFORMATION PROCESSING APPARATUS CAPABLE OF DELETING PAUSE FILLERS FROM MOVING IMAGE, INFORMATION PROCESSING SYSTEM, METHOD OF CONTROLLING INFORMATION PROCESSING APPARATUS, METHOD OF CONTROLLING INFORMATION PROCESSING SYSTEM, AND STORAGE MEDIUM

(71) Applicant: CANON KABUSHIKI KAISHA, Tokyo (JP)

(72) Inventor: Hirotaka Oda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/634,571

(22) Filed: Apr. 12, 2024

(65) Prior Publication Data

US 2024/0347077 A1 Oct. 17, 2024

(30) Foreign Application Priority Data

Apr. 17, 2023 (JP) .................................. 2023-067278

(51) Int. Cl.
*G11B 27/031* (2006.01)
*G06T 7/20* (2017.01)
(Continued)

(52) U.S. Cl.
CPC .............. *G11B 27/031* (2013.01); *G06T 7/20* (2013.01); *G06V 40/10* (2022.01); *G10L 15/22* (2013.01);
(Continued)

(58) Field of Classification Search
CPC ......... G11B 27/031; G11B 27/06; G06T 7/20; G06T 2207/10016; G06T 2207/30201;
(Continued)

(56) References Cited

U.S. PATENT DOCUMENTS 7,756,710 B2 * 7/2010 Franco .................... G10L 15/22
704/255
10,755,704 B2 * 8/2020 Honda .................... G10L 25/63
(Continued)

FOREIGN PATENT DOCUMENTS

JP 2020096373 A 6/2020

*Primary Examiner* — Helen Shibru
(74) *Attorney, Agent, or Firm* — Canon U.S.A., Inc., IP Division

(57) ABSTRACT

An information processing apparatus capable of easily deleting meaningless utterances from a moving image without making the moving image unnatural. A moving image including sound information is acquired, and contents of an utterance by a speaker, which is recorded in the moving image, are analyzed based on the sound information of the moving image. A section including the meaningless utterance, in which a meaningless utterance uttered by the speaker appears, is acquired from a timeline of the sound information based on a result of the analysis. The speaker on a screen of the moving image in the section including the meaningless utterance is detected. Editing for deleting the meaningless utterance from the moving image is executed with respect to the section including the meaningless utterance of the moving image according to a result of the detection.

14 Claims, 14 Drawing Sheets

(51) Int. Cl.
  *G06V 40/10* (2022.01)
  *G10L 15/22* (2006.01)
  *G10L 25/57* (2013.01)
  *G10L 25/84* (2013.01)
  *G11B 27/06* (2006.01)

(52) U.S. Cl.
  CPC .............. *G10L 25/57* (2013.01); *G10L 25/84* (2013.01); *G11B 27/06* (2013.01); *G06T 2207/10016* (2013.01); *G06T 2207/30201* (2013.01)

(58) Field of Classification Search
  CPC ......... G06V 40/10; G10L 15/22; G10L 25/57; G10L 25/84; G10L 15/08
  USPC ........................................................ 386/285
  See application file for complete search history.

(56) References Cited

U.S. PATENT DOCUMENTS

| | | | |
|---|---|---|---|
| 11,363,083 B2 * | 6/2022 | Kegel | H04L 65/4061 |
| 2021/0065582 A1 * | 3/2021 | Liao | G10L 15/02 |
| 2021/0166698 A1 * | 6/2021 | Saito | G10L 15/22 |
| 2025/0166311 A1 * | 5/2025 | Montero, Jr. | G06T 7/10 |

* cited by examiner

*FIG. 5*

| UTTERANCE ID | PAUSE FILLER |
|---|---|
| 001 | "Ah" |
| 002 | "Umm" |
| 003 | "Well" |
| 004 | "Hmm" |
| ... | ... |
| 100 | USER DEFINED UTTERANCE 1 |
| 101 | USER DEFINED UTTERANCE 2 |
| 102 | USER DEFINED UTTERANCE 3 |

| START TIME | END TIME | UTTERANCE ID | PROCESSING |
|---|---|---|---|
| 00:00:10 | 00:00:12 | 1 | SCENE CUTTING |
| 00:04:15 | 00:04:18 | 3 | MUTING |
| 00:07:23 | 00:07:25 | 2 | NON-PROCESSING |
| 00:10:36 | 00:10:39 | 100 | SCENE CUTTING |

INFORMATION PROCESSING APPARATUS CAPABLE OF DELETING PAUSE FILLERS FROM MOVING IMAGE, INFORMATION PROCESSING SYSTEM, METHOD OF CONTROLLING INFORMATION PROCESSING APPARATUS, METHOD OF CONTROLLING INFORMATION PROCESSING SYSTEM, AND STORAGE MEDIUM

BACKGROUND

Field of the Disclosure

The present disclosure relates to an information processing apparatus, an information processing system, a method of controlling the information processing apparatus, a method of controlling the information processing system, and a storage medium, and more particularly to an information processing apparatus that mutes or deletes a video of a section in which pause fillers appear in moving image data including sound and images, an information processing system, a method of controlling the information processing apparatus, a method of controlling the information processing system, and a storage medium.

Description of the Related Art

As a moving image distribution service and the like have become widespread, photographing, editing, and distributing of a moving image are widely performed even among general video photographers, not for the purpose of personal recording, but for the purpose of disclosing the moving image to a third party. In many cases, voice of explanation or narration is recorded with a moving image. In this recording, a speaker sometimes utters particular favorite meaningless utterances or so-called pause fillers, such as "Ah" and "Umm".

To cope with this, for example, Japanese Laid-Open Patent Publication (Kokai) No. 2020-96373 discloses, for a function of generating a screen television optical slide projector (telop) from voice data in a moving image, a method of deleting pause fillers from a generated telop text.

However, in the technique disclosed in Japanese Laid-Open Patent Publication (Kokai) No. 2020-96373, although the pause fillers are deleted from the screen telop, the voice itself is not deleted from the moving image, and hence a sense of strangeness felt by viewers is caused by utterance of the pause fillers when the moving image is reproduced.

On the other hand, it takes a lot of time and effort for a user to reproduce a moving image, identify a section in which pause fillers appear, delete the voice in the identified section, and then edit the moving image such that the moving image becomes natural.

SUMMARY

The present disclosure provides an information processing apparatus that is capable of easily deleting meaningless utterances from a moving image without making the moving image unnatural, an information processing system, a method of controlling the information processing apparatus, a method of controlling the information processing system, and a storage medium.

In a first aspect of the present disclosure, there is provided an information processing apparatus including a first acquisition unit configured to acquire a moving image including sound information, a sound analysis unit configured to analyze the sound information of the acquired moving image to identify an utterance by a speaker present in the acquired moving image, a second acquisition unit configured to acquire, based on a result of the analysis of the sound information, a section including a meaningless utterance uttered by the speaker from the acquired moving image, a detection unit configured to detect the speaker within the moving image in the section including the meaningless utterance, and a moving image-editing unit configured to execute editing that deletes at least the meaningless utterance from the moving image with respect to the section including the meaningless utterance, according to a result of the detection.

In a second aspect of the present disclosure, there is provided an information processing system including an image capturing apparatus that captures a moving image including sound information, an information processing apparatus that edits the moving image, and a display apparatus, the information processing apparatus including a first acquisition unit configured to acquire a moving image including sound information, a sound analysis unit configured to analyze the sound information of the acquired moving image to identify an utterance by a speaker present in the acquired moving image, a second acquisition unit configured to acquire, based on a result of the analysis of the sound information, a section including a meaningless utterance uttered by the speaker from the acquired moving image, a detection unit configured to detect the speaker within the moving image in the section including the meaningless utterance, a moving image-editing unit configured to execute editing that deletes at least the meaningless utterance from the moving image with respect to the section including the meaningless utterance, according to a result of the detection, and a display instruction unit configured to instruct, after the moving image has been edited by the moving image-editing unit, an external apparatus to display an edited moving image, and the display apparatus including a display unit configured to display the edited moving image according to an instruction from the display instruction unit.

According to the present disclosure, it is possible to easily delete meaningless utterances from a moving image without making the moving image unnatural.

Further features of the present disclosure will become apparent from the following description of exemplary embodiments (with reference to the attached drawings).

BRIEF DESCRIPTION OF THE DRAWINGS

FIG. 5 is a diagram showing an example of a pause filler management table held by the information processing server.

DESCRIPTION OF THE EMBODIMENTS

The present disclosure will now be described in detail below with reference to the accompanying drawings showing embodiments thereof. However, the components described in the following embodiments illustrate configuration of the present disclosure, only by way of example, and are by no means intended to limit the scope of the present disclosure.

An information processing system 1 according to a first embodiment as one of preferred embodiments of the present disclosure will be described below with reference to the accompanying drawings.

In the information processing system 1, when moving image data including sound, which is captured by an image capturing apparatus 101, is uploaded to a cloud, a moving image-editing process is performed by an information processing server 103 on the cloud with respect to the uploaded moving image data. Further, a user mentioned here refers to a person that uses the information processing system 1.

Figure 1:
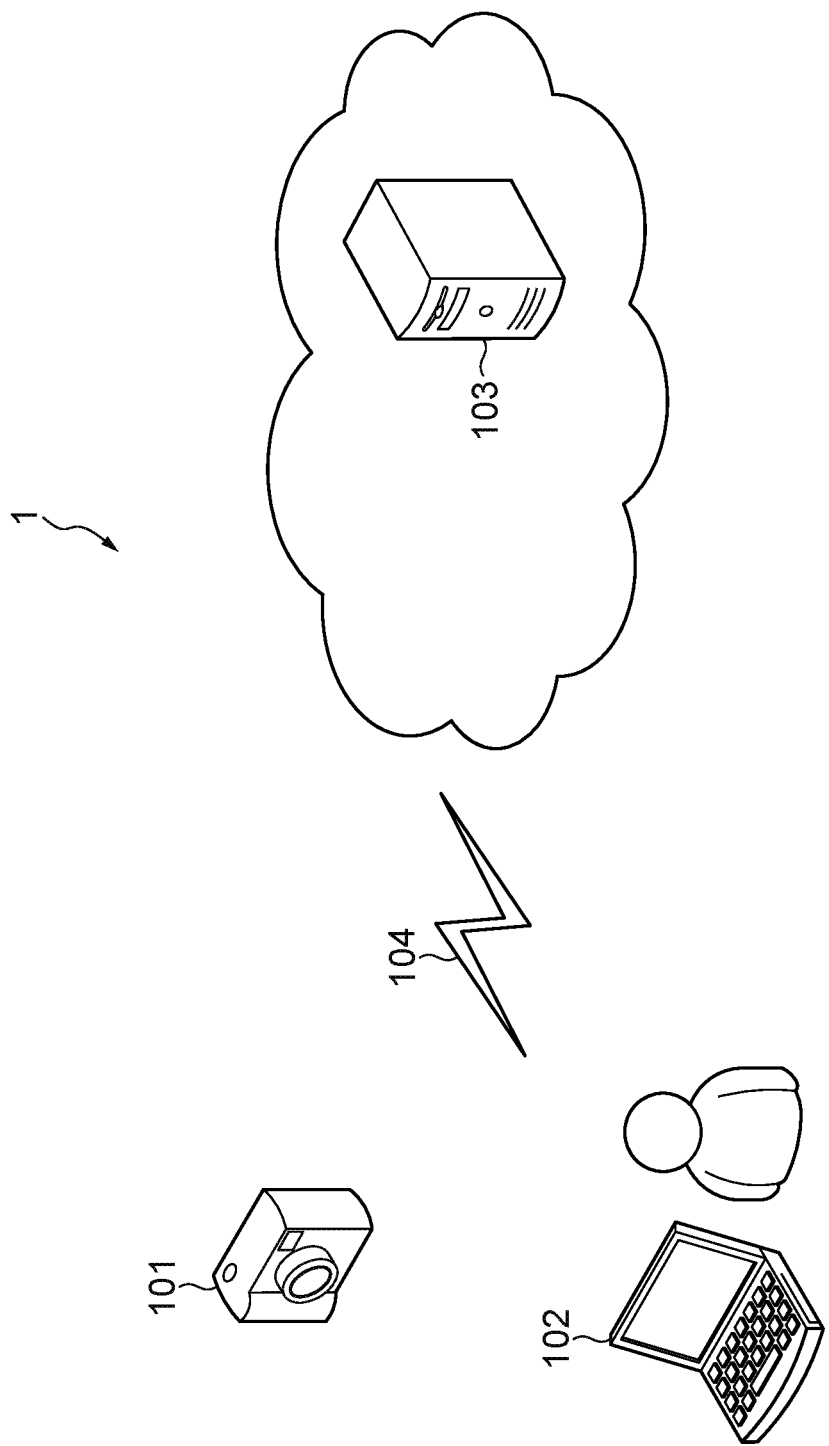
FIG. 1 is a diagram showing an entire configuration of an information processing system according to a first embodiment of the present disclosure.

FIG. 1 is a diagram showing an entire configuration of the information processing system 1 according to the present embodiment.

Referring to FIG. 1, the information processing system 1 includes the image capturing apparatus 101, an information processing apparatus 102, and the information processing server 103.

The image capturing apparatus 101 is used to capture moving image data on which the moving image-editing process, described hereinafter, is to be performed by the information processing server 103. Note that moving image data to be processed in the present embodiment is not limited to be of a specific form, such as a specific format or a specific codec.

The information processing apparatus 102 is a terminal device of a user using the information processing system 1 and is also used as a medium (display apparatus) for acquiring information transmitted from the information processing server 103 and displaying the acquired information.

The information processing server 103 is an information processing apparatus existing on the cloud and performs the moving image-editing process, described hereinafter, on moving image data captured by the image capturing apparatus 101 and uploaded. Further, when the moving image-editing process performed on the uploaded moving image data is terminated, the information processing server 103 transmits the processed moving image data to the information processing apparatus 102 to allow the information processing apparatus 102 to display the processed moving image data. The moving image data captured by the image capturing apparatus 101 is uploaded from a local environment of the user to the information processing server 103 via a network 104.

The network 104 can use whichever of wireless communication or wired communication, depending on the form of the network 104. Further, in the information processing system 1, means for transmitting moving image data to the information processing server 103 is not limited to a specific form, but any other means other than the communication via the network 104 can be used. In the case of the present embodiment, moving image data can be directly uploaded from the image capturing apparatus 101 to the information processing server 103, or can be uploaded from the image capturing apparatus 101 to the information processing server 103 via the information processing apparatus 102.

Note that in the present embodiment, the information processing server 103 is configured as a single server but can be configured as a plurality of servers which exist on the cloud, with respective different functions, and cooperate with each other. Further, the information processing server 103 can be configured as a plurality of electronic devices having respective same functions as mentioned above. Further, the information processing server 103 can also be configured as a server or an electronic device aggregating the functions of the information processing server 103.

Although in the present embodiment, an output destination of a processing result from the information processing server 103 is set to the information processing apparatus 102 by way of example, this is not limitative, depending on a format of data to be output. In a case where a server or the like of another system is connected as the output destination of the information processing server 103, an output of data to be displayed in a text file format or displayed on a UI is not needed, but the data can be output in accordance with the format of a database or the like.

Further, although in the present embodiment, moving image data is uploaded from the image capturing apparatus 101 or the information processing apparatus 102 to the cloud, and the information processing server 103 on the cloud performs processing on the uploaded moving image data, this is not limitative. For example, a form can be envisaged in which the functions of the information processing server 103 are installed on the information processing apparatus 102.

Figure 2:
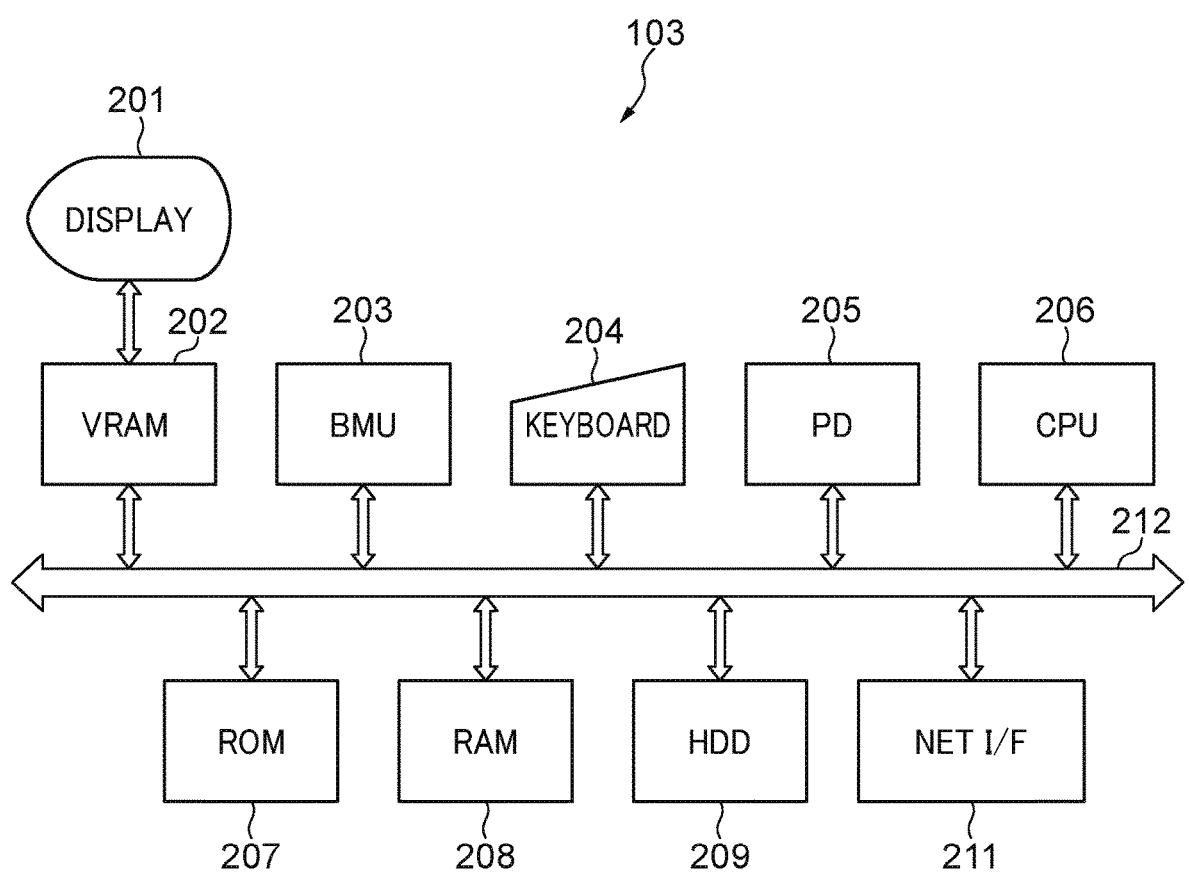
FIG. 2 is a block diagram showing an internal hardware configuration of an information processing server appearing in FIG. 1.

FIG. 2 is a block diagram showing an internal hardware configuration of the information processing server 103 appearing in FIG. 1.

Referring to FIG. 2, the information processing server 103 includes a display 201, a VRAM 202, a bit move unit (BMU) 203, a keyboard 204, a pointing device (PD) 205, a CPU 206, a ROM 207, a RAM 208, an HDD 209, a network (NET) I/F 211, and a bus 212.

On the display 201, icons, a message, a menu, and other user interface information for managing, for example, the information processing apparatus 102 are displayed.

In the VRAM 202, an image to be displayed on the display 201 is drawn. The image data generated in the VRAM 202 is transferred to the display 201 according to a predetermined rule, whereby the image is displayed on the display 201.

The BMU 203 controls, for example, data transfer between memories (between the VRAM 202 and another memory, for example) and data transfer between a memory and each I/O device (the NET I/F 211, for example).

The keyboard 204 has a variety of keys for inputting characters, for example.

The PD 205 is used to point an icon, a menu, and any other content, displayed on the display 201, or drag and drop an object.

The CPU 206 controls each device based on an OS and control programs, including programs described hereinafter, which are stored in the ROM 207 and the HDD 209.

The ROM 207 stores a variety of control programs and data.

The RAM 208 has a work area for the CPU 206, an area for saving data when error handling is performed, an area for loading control programs, and so forth.

The HDD 209 stores the control programs executed in the information processing server 103 and data including temporarily saved data.

The NET I/F 211 is an interface for performing communication with another information processing apparatus, a printer, and the like, via a network.

The bus 212 includes an address bus, a data bus, and a control bus.

The control programs executed by the CPU 206 can be provided from the ROM 207 or the HDD 209, and can be provided through a network from another server or the like via the NET I/F 211.

Note that the internal hardware configuration of the information processing apparatus 102 is the same as that of the information processing server 103 shown in FIG. 2. Therefore, the internal hardware configuration of the information processing apparatus 102 is represented by adding "a" to the end of the reference numeral of each internal hardware component of the information processing server 103, and redundant description is omitted. That is, for example, the control of the devices of the information processing apparatus 102 is executed by a CPU 206a.

Figure 3:
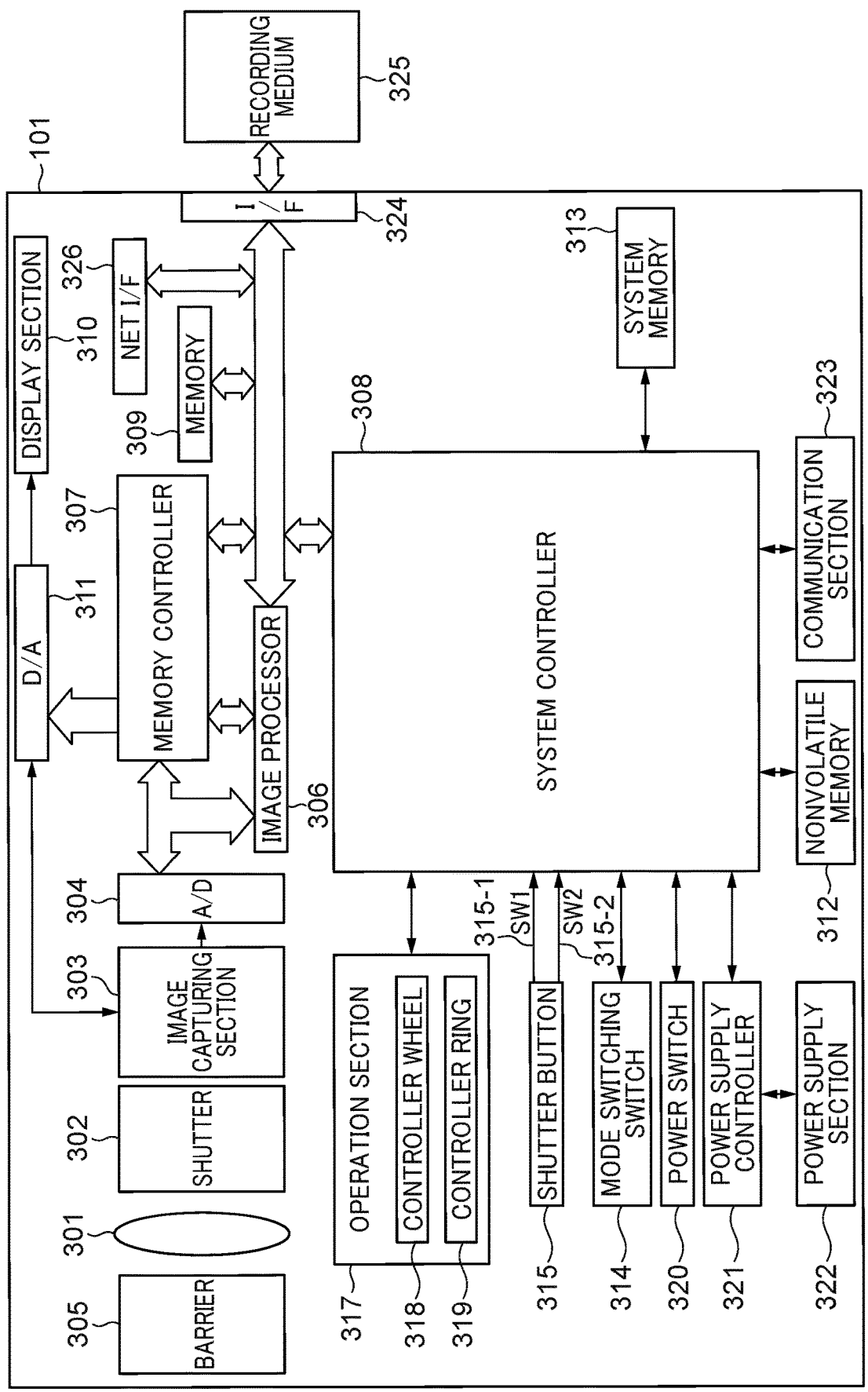
FIG. 3 is a schematic block diagram showing a hardware configuration of an image capturing apparatus appearing in FIG. 1.

FIG. 3 is a schematic block diagram showing a hardware configuration of the image capturing apparatus 101.

Referring to FIG. 3, the image capturing apparatus 101 includes a photographic lens 301, a shutter 302, an image capturing section 303, an analog-to-digital (A/D) converter 304, a barrier 305, an image processor 306, a memory controller 307, a system controller 308, a memory 309, a display section 310, and a digital-to-analog (D/A) converter 311. Further, the image capturing apparatus 101 includes a nonvolatile memory 312, a system memory 313, a mode switching switch 314, a shutter button 315, a first shutter switch 315_1, a second shutter switch 315_2, and an operation section 317. The image capturing apparatus 101 further includes a controller wheel 318, a controller ring 319, a power switch 320, a power supply controller 321, a power supply section 322, a communication section 323, an I/F 324, a recording medium 325, and a NET I/F 326.

The photographic lens 301 is formed by a lens group including a zoom lens and a focus lens and is arranged in a lens barrel, not shown.

The shutter 302 has an aperture function and adjusts the amount of light guided from the photographic lens 301 to the image capturing section 303.

The image capturing section 303 is implemented by a CCD, a CMOS device, or the like, which converts an optical image to electrical signals.

The A/D converter 304 converts analog signals output from the image capturing section 303 to digital signals.

The barrier 305 covers the photographing lens 301 and the like to thereby prevent an image capturing system including the photographic lens 301, the shutter 302, and the image capturing section 303 from being stained and damaged.

The image processor 306 performs predetermined pixel interpolation, resizing, such as size reduction, and color conversion, on image data received from the A/D converter 304 or image data received from the memory controller 307. Further, the image processor 306 performs predetermined calculation processing using captured image data, and the system controller 308 performs exposure control and ranging control based on a result of the calculation. Further, image data output from the A/D converter 304 is written into the memory 309 via the image processor 306 and the memory controller 307 or only via the memory controller 307.

The system controller 308 controls the overall operation of the image capturing apparatus 101. The system controller 308 realizes a variety of processing operations performed by the image capturing apparatus 101 executing programs stored in the nonvolatile memory 312.

The memory 309 stores image data captured by the image capturing section 303 and converted to digital data by the A/D converter 304, and image data to be displayed on the display section 310. The memory 309 has a sufficient storage capacity to store a predetermined number of still images and a predetermined time period of moving images and sound. Further, the memory 309 also functions as a memory (video memory) for image display.

The D/A converter 311 converts the image data for image display, which is stored in the memory 309, to analog signals and supplies the analog signals to the display section 310. Thus, the image data for image display, which is written in the memory 309, is displayed on the display section 310 via the D/A converter 311.

The display section 310 is a display device, such as an LCD, and performs display according to analog signals received from the D/A converter 311.

The nonvolatile memory 312 is an electrically recordable/erasable memory, and for example, an EEPROM or the like is used. The nonvolatile memory 312 stores constants for the operation of the system controller 308, control programs, including programs for performing cooperation, described hereinafter, and so forth.

As the system memory 313, a RAM, for example, is used. In the system memory 313, the constants for the operation of the system controller 308, variables, programs read out from the nonvolatile memory 312, and so forth are loaded.

The mode switching switch 314, the shutter button 315, the first shutter switch 315_1, the second shutter switch 315_2, and the operation section 317 form an operation unit for inputting a variety of operation instructions to the system controller 308. The mode switching switch 314 switches the operation mode of the system controller 308 to one of a still image recording mode, a moving image recording mode, a reproduction mode, and so forth. The first shutter switch 315_1 is turned on by half operation of the shutter button 315 arranged on the image capturing apparatus 101, i.e. when the shutter button 315 is brought to a half pressed state (photographing preparation instruction) to thereby generate a first shutter switch signal SW1. When the first shutter switch signal SW1 is generated, the system controller 308 starts an operation of auto focus (AF) processing. The second shutter switch 315_2 is turned on by complete operation of the shutter button 315, i.e. when the shutter button 315 is brought to a fully pressed state (photographing instruction) to thereby generate a second shutter switch signal SW2. When the second shutter switch signal TW2 is generated, the system controller 308 starts a series of photographing processing operations, starting from readout of signals from the image capturing section 303 to writing of image data into the recording medium 325.

The operation members of the operation section 317 each have a function appropriately assigned for each scene and function as a variety of function buttons when various types of function icons displayed on the display section 310 are selectively operated. Here, the variety of function buttons include a confirmation button, an end button, a return button, an image scroll button, a jump button, a narrowing button, an attribute change button, and so forth. For example, when a menu button is pressed, a menu screen on which a variety of settings can be set is displayed on the display section 310. A user can intuitively configure the variety of settings by using the menu screen displayed on the display section 310, a four-direction button, and a SET button.

The controller wheel 318 is an operation member which can be rotatably operated and is included in the operation section 317, and also has the function of the four-direction button that receives a user's pressing operation on any of upper, lower, right, and left parts thereof. The user can select the variety of function buttons displayed on the menu screen by rotating the controller wheel 318 and pressing the upper, lower, right, and left parts of the controller wheel 318. The controller wheel 318 generates an electrical pulse signal according to a rotating operation and a pressing operation on any of the upper, lower, right, and left parts thereof, performed by a user. The system controller 308 determines an angle through which the controller wheel 318 has been rotated, how many times the controller wheel 318 has been rotated, which part of the upper, lower, right, and left parts has been pressed, and so forth, based on the pulse signal, and controls the components of the image capturing apparatus 101. Note that for the controller wheel 318, any operation member can be used insofar as it is an operation member which can detect a rotating operation and an operation of pressing the four-direction button.

The controller ring 319 is a rotational operation member included in the operation section 317 and can be rotated about an optical axis around the lens barrel. The controller ring 319 generates an electrical pulse signal in accordance with a user's rotational operation. The system controller 308 determines an angle through which the controller ring 319 has been rotated, how many times the controller ring 319 has been rotated, and so forth, based on the pulse signal, and controls the components of the image capturing apparatus 101. Further, when a button for switching the function of the controller ring 319, included in the operation section 317, is pressed, a menu screen from which the function to be assigned to the controller ring 319 can be changed is displayed on the display section 310.

In the present embodiment, the controller ring 319 and the controller wheel 318 are used for selecting a normal mode item and changing values set by thereby.

The power switch 320 is a switch for switching power-on/off of the image capturing apparatus 101.

The power supply controller 321 is formed by a battery detection circuit, a DC-DC converter, a switch circuit for switching a block to be energized, and so forth. The power supply controller 321 detects whether or not a battery is attached, a type of a battery, and a battery remaining amount. Further, the power supply controller 321 controls the DC-DC converter based on a result of the detection and an instruction from the system controller 308 to supply necessary voltage to the components including the recording medium 325, for a necessary time period.

The power supply section 322 is formed by a primary battery, such as an alkaline battery or a lithium battery, a secondary battery, such as a NiCd battery, an NiMH battery, or a Li battery, an AC adapter, or the like.

The communication section 323 transmits an image stored in the recording medium 325 to an external apparatus.

The I/F 324 is an interface with the recording medium 325, and the recording medium 325 is implemented by a semiconductor memory, a magnetic disk, or the like.

The NET I/F 326 is controlled by the system controller 308 to perform communication via a network.

Note that FIG. 3 shows an example of the hardware configuration of the image capturing apparatus 101, but the shutter 302, the mode switching switch 314, the display section 310, and the like are not necessarily required for the image capturing apparatus 101.

Figure 4:
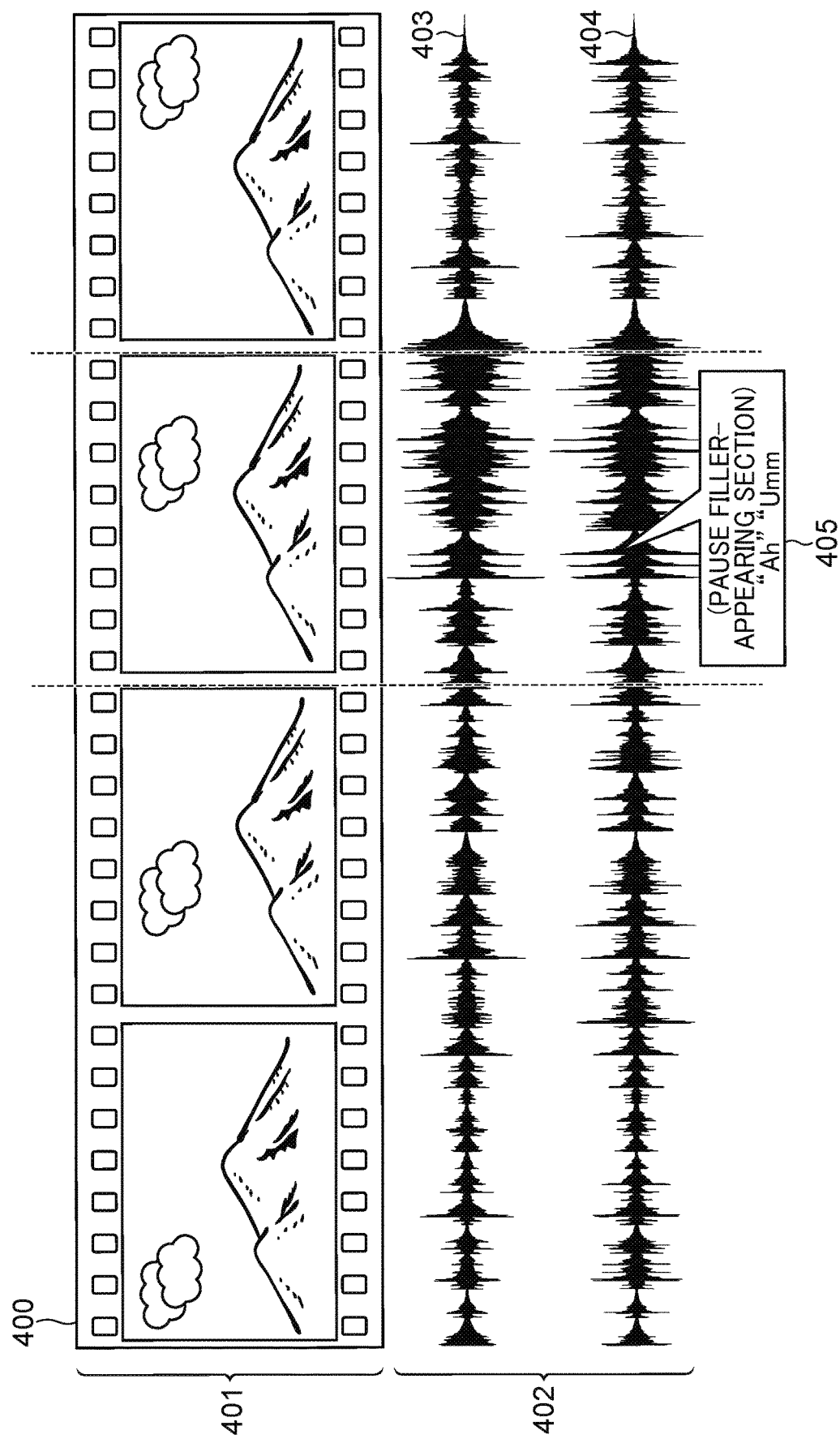
FIG. 4 is a diagram showing an example of moving image data to be processed by the information processing server.

FIG. 4 is a diagram showing an example of moving image data 400 to be processed by the information processing server 103.

The moving image data 400 is formed by a video record 401 that records a video and a sound record 402 that records sound. The sound record 402 can further include a plurality of channels 403 and 404.

In the sound record 402, environmental sound and an utterance of a speaker have been recorded, and in this record, there are recorded favorite meaningless utterances uttered by a speaker, including pause fillers, such as "Ah" and "Umm" which appear during a plurality of respective time periods (hereinafter referred to as a plurality of pause filler-appearing sections). For example, on a timeline of the sound record 402 appearing in FIG. 4, a pause filler-appearing section 405 is included.

FIG. 5 is a diagram showing an example of a pause filler management table 500 held by the information processing server 103. In the present embodiment, utterances treated as pause fillers in the sound of a moving image are defined in the pause filler management table 500. One pause filler management table 500 is generated by the information processing server 103 and is commonly referred to in a plurality of moving image-editing processes according to the embodiment of the present disclosure.

Referring to FIG. 5, the pause filler management table 500 has an utterance ID management column 501C and a pause filler management column 502C.

The utterance ID management column 501C is a column for managing utterance IDs 501 each uniquely assigned to an associated defined pause filler. The utterance ID 501 is used to distinguish pause fillers in a pause filler-appearing section management table, described hereinafter.

The pause filler management column 502C is a column for managing defined pause fillers. As pause fillers, not only typical utterances 503, which have been preset and registered and are commonly recognized in all moving images, but also desired additionally defined utterances 504, including user's favorite meaningless utterances, can be registered. When registering an additionally defined utterance 504, a word can be registered not only by inputting text, but also by recording, designating a time range of voice in a moving image to be edited.

The pause filler management table 500 can be uniquely generated by the information processing server 103 or can be generated for each moving image to be processed.

Figure 6:
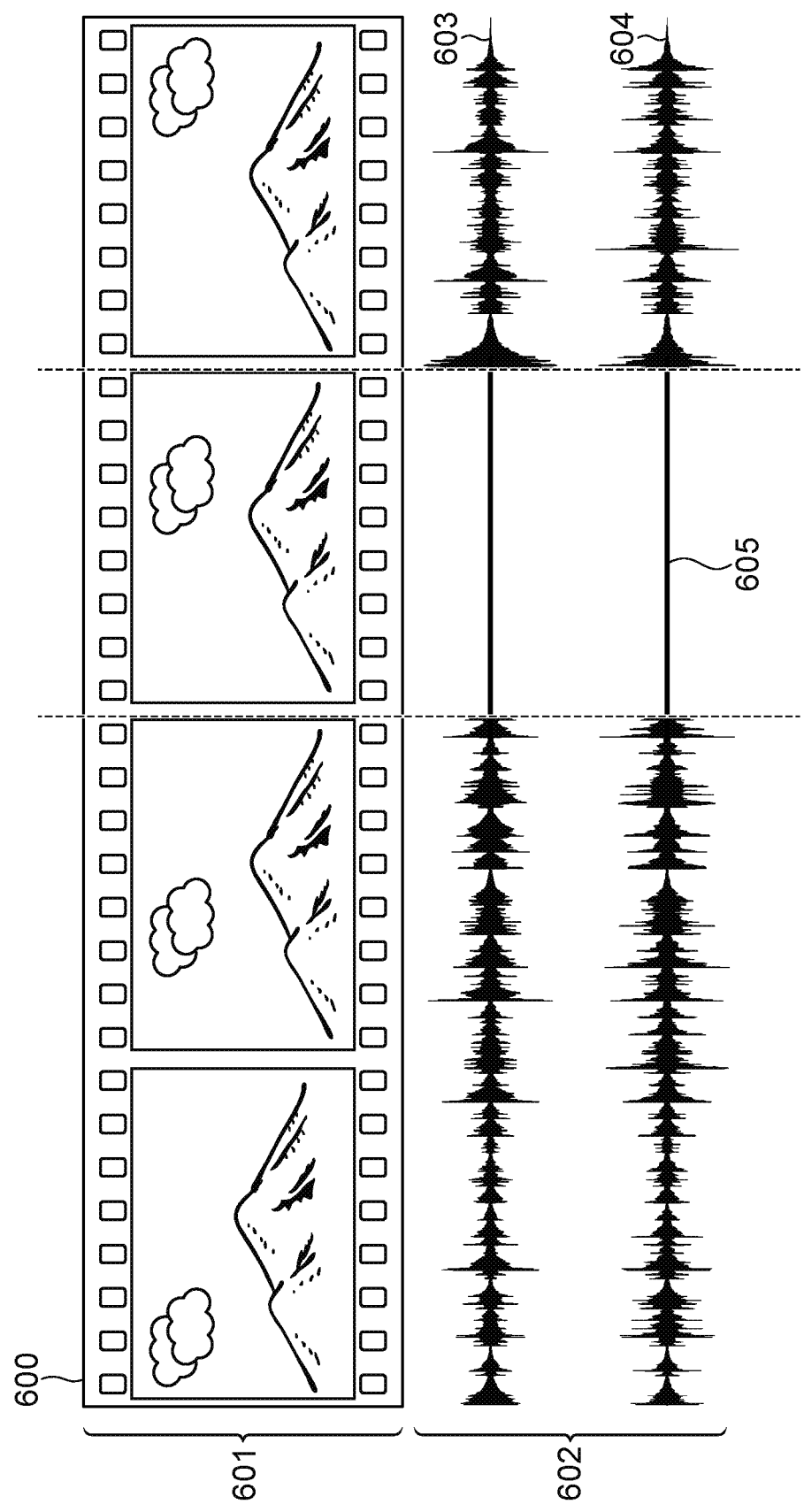
FIG. 6 is a diagram showing moving image data obtained after deletion of pause fillers, according to the first embodiment, which is executed by the information processing server.

FIG. 6 is a diagram showing moving image data 600 obtained after deletion of pause fillers, according to the present embodiment, which is executed by the information processing server 103.

The moving image data 400 to be processed is subjected to deletion of pause fillers registered in the pause filler management table 500 and appearing in a pause filler-appearing section, by the moving image-editing process, described hereinafter with reference to FIG. 8, which is executed by the information processing server 103 according to the present embodiment. In the present embodiment, specifically, muting 605 of sound data is performed only on the pause filler-appearing section 405 of the sound record 402 without altering the video record 401 of the moving image data 400. Note that in FIG. 6, reference numerals 601, 602, 603, and 604 indicate a video record, a sound record, and a plurality of channels, respectively.

Figure 7:
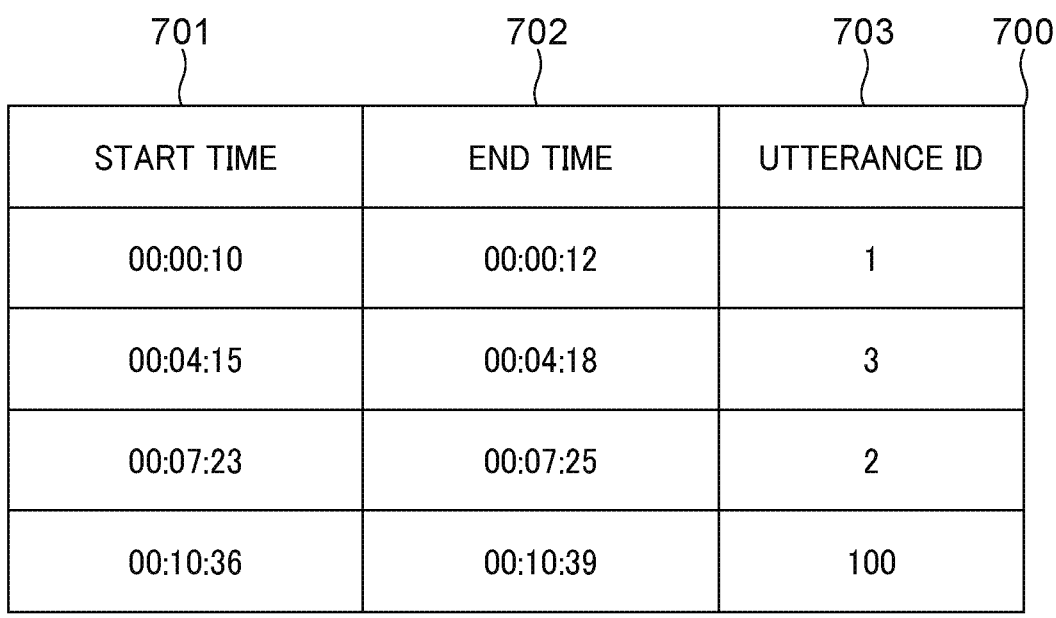
FIG. 7 is a diagram showing a pause filler-appearing section management table according to the first embodiment, which holds results of sound information analysis performed for each moving image by the information processing server.

FIG. 7 is a diagram showing the pause filler-appearing section management table, denoted by reference numeral 700, according to the present embodiment, which holds results of sound information analysis performed, on a moving image-by-moving image basis, by the information processing server 103. In the pause filler-appearing section management table 700, a registered record is generated for each pause filler-appearing section of a moving image to be processed.

Referring to FIG. 7, the pause filler-appearing section management table 700 is formed by a start time management column 701, an end time management column 702, and an utterance ID management column 703.

The start time management column 701 records an elapsed time of moving image reproduction (indicating a start time) at which a section is started in which a specific pause filler was uttered in the sound data of the moving image to be processed.

The end time management column 702 records an elapsed time of moving image reproduction (indicating an end time) at which the section is ended in which the specific pause filler was uttered in the sound data of the moving image to be processed. The section to be processed is identified by the start time managed in the start time management column 701 and the end time managed in the end time management column 702.

Note that in the end time management column 702, a time difference between the start time and the end time can be recorded.

The utterance ID management column 703 records the utterance ID 501 of a pause filler in a section in which the pause filler was uttered.

Figure 8:
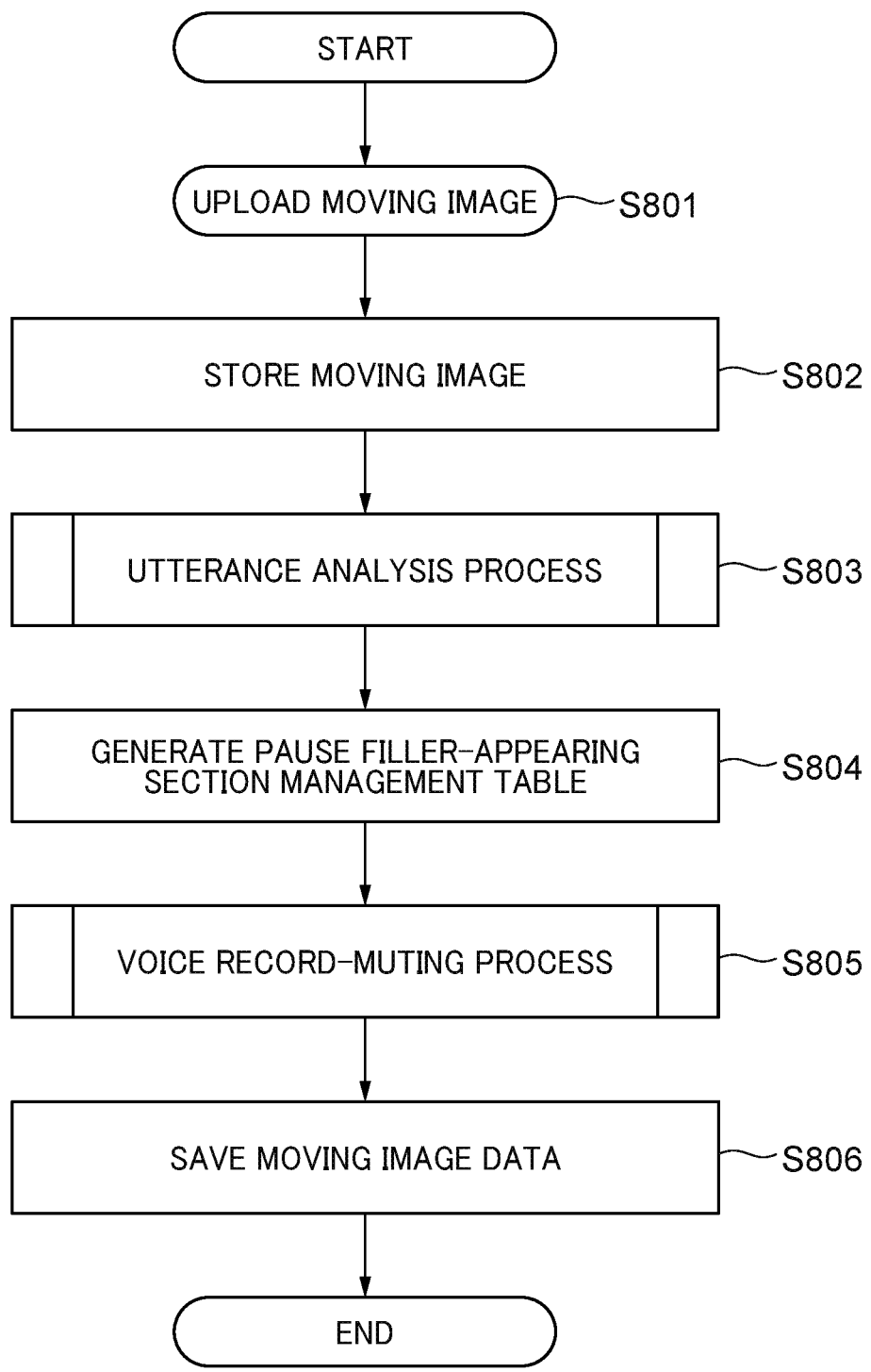
FIG. 8 is a flowchart of a moving image-editing process according to the first embodiment, which is performed by the information processing server.

FIG. 8 is a flowchart of the moving image-editing process according to the present embodiment, which is performed by the information processing server 103. The present process is executed by the CPU 206 loading a program stored in the ROM 207 into the RAM 208 of the information processing server 103.

When, in a step S801, the CPU 206 (first acquisition unit) detects that the moving image data 400 has been uploaded to the information processing server 103 directly from the image capturing apparatus 101 or via the information processing apparatus 102, the CPU 206 proceeds to a step S802.

In the step S802, the CPU 206 stores the moving image data 400 uploaded in the step S801 in the RAM 208 or the HDD 209 of the information processing server 103.

In a step S803, the CPU 206 performs an utterance analysis process, described hereinafter with reference to FIG. 9. In the utterance analysis process, the CPU 206 (sound analysis unit/second acquisition unit) performs sound analysis on the sound record 402 of the moving image data 400 stored in the step S802, converts the uttered contents into text, and identifies a pause filler managed in the pause filler management column 502C. Note that the contents of utterances converted into text and a list of pause filler-appearing sections, which have been obtained by executing the utterance analysis process, can be output as a file.

In a step S804, the CPU 206 generates the pause filler-appearing section management table 700, described with reference to FIG. 7, from the list of the pause filler-appearing sections, which is obtained by the utterance analysis process in the step S803.

Figure 10:
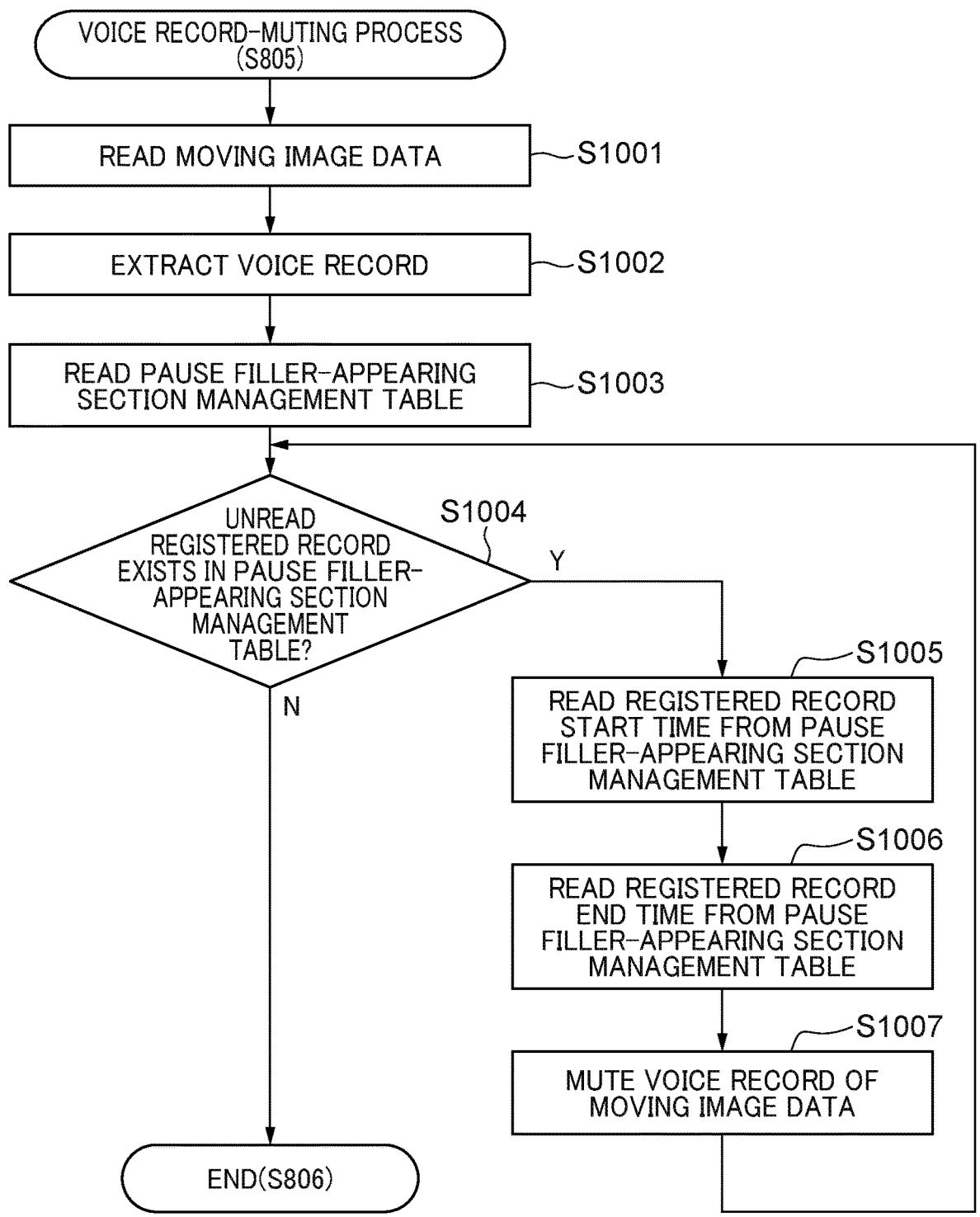
FIG. 10 is a flowchart of a sound record-muting process in a step in FIG. 8.

In a step S805, the CPU 206 (moving image-editing unit/muting unit) performs a sound record-muting process, described hereafter with reference to FIG. 10, based on the registered records of the pause filler-appearing section management table 700 generated in the step S804. Although details will be described hereinafter with reference to FIG. 10, by executing this process, the muting 605 for deleting sound signals in all of the pause filler-appearing sections from the sound record 402 of the moving image data 400 is performed, whereby the edited moving image data 600 is generated.

In a step S806, the CPU 206 saves the moving image data 600 generated in the step S805 in the RAM 208 or the HDD 209 of the information processing server 103. Further, the CPU 206 (display instruction unit) transmits the moving image data 600 and a display instruction for displaying the moving image data 600 to the information processing apparatus 102 (external apparatus/display apparatus) at the same time. After that, the CPU 206 terminates the present process. In the information processing apparatus 102, the moving image data 600 is displayed on a display, not shown, according to the display instruction received from the information processing server 103.

Figure 9:
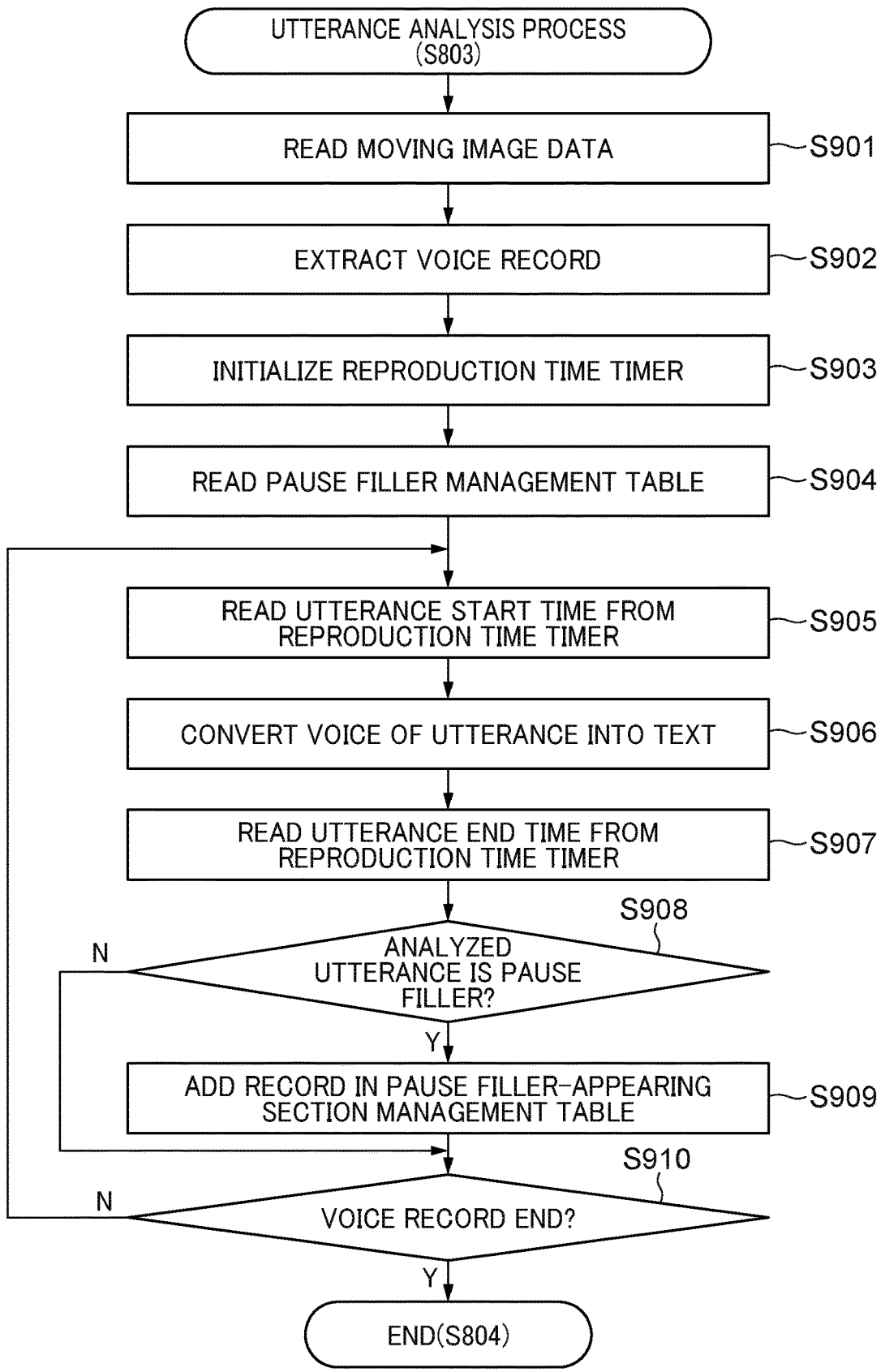
FIG. 9 is a flowchart of an utterance analysis process in a step in FIG. 8.

FIG. 9 is a flowchart of the utterance analysis process in the step S803 in FIG. 8.

In a step S901, the CPU 206 reads out the moving image data 400 stored in the RAM 208 or the HDD 209 in the step S802.

Then, in a step S902, the CPU 206 extracts the sound record 402 of the moving image data 400 read out in the step S901.

In a step S903, the CPU 206 generates a reproduction time timer for managing a moving image reproduction time in the RAM 208 and initializes the reproduction time. As the timeline of the moving image data 400 progresses, the reproduction time timer records the time.

In a step S904, the CPU 206 loads the pause filler management table 500 into the RAM 208 of the information processing server 103.

In a step S905, when utterance analysis of the sound record 402 is started, the CPU 206 reads a moving image reproduction time at the start of an utterance (elapsed time of moving image reproduction) from the reproduction time timer generated in the step S903. The CPU 206 acquires this time as an utterance start time at which a specific utterance was started and stores the acquired time in the RAM 208.

In a step S906, the CPU 206 converts the voice of an utterance in the sound record 402 into text and stores the text in the RAM 208. The information of the text obtained by conversion in this step can be separately output to the HDD 209 as text information.

In a step S907, the CPU 206 reads a moving image reproduction time at the end of the utterance (elapsed time of moving image reproduction) from the reproduction time timer generated in the step S903. The CPU 206 acquires this time as an utterance end time at which the specific utterance was terminated and stores the acquired time in the RAM 208.

In a step S908, the CPU 206 determines whether or not the utterance completed in conversion to text in the step S907 is registered in the pause filler management table 500 loaded into the RAM 208 in the step S904. In other words, the CPU 206 performs analysis of the utterance. If it is determined that the utterance converted into text is an utterance registered in the pause filler management table 500, i.e. a pause filler (YES to the step S908), the CPU 206 proceeds to a step S909. On the other hand, if it is determined that the utterance converted into text is not a pause filler (NO to the step S908), the CPU 206 directly proceeds to a step S910.

In the step S909, the CPU 206 records a result of the analysis in the pause filler-appearing section management table 700 as a registered record. Specifically, the CPU 206 records the times read in the steps S905 and S907 in the start time management column 701 and the end time management column 702 as the start time and the end time of the registered record, respectively, and records the utterance ID 501 of the pause filler in the utterance ID management column 703.

In the step S910, if the reproduction time timer has reached the end of the moving image data 400 (YES to the step S910), the CPU 206 terminates the present process. On the other hand, if the reproduction time timer has not reached the end of the moving image data 400 (NO to the step S910), the CPU 206 returns to the step S905 and restarts the utterance analysis of the sound record 402. Thus, by sequentially performing the utterance analysis of the sound record 402 until the reproduction time timer reaches the end of the moving image data 400, the utterances in the moving image data 400 are analyzed, and from the analysis, a list of the pause fillers is generated in the form of the pause filler-appearing section management table 700.

FIG. 10 is a flowchart of the sound record-muting process in the step S805 in FIG. 8.

In a step S1001, the CPU 206 reads out the moving image data 400 stored in the RAM 208 or the HDD 209 in the step S802.

In a step S1002, the CPU 206 extracts the sound record 402 of the moving image data 400 read in the step S1001.

In a step S1003, the CPU 206 loads the pause filler-appearing section management table 700 generated in the step S804 into the RAM 208.

In a step S1004, the CPU 206 checks whether or not there is an unread registered record indicated by a record pointer of the pause filler-appearing section management table 700 loaded in the RAM 208. If there is an unread registered record (YES to the step S1004), the CPU 206 proceeds to a step S1005. On the other hand, if there is no unread registered record (NO to the step S1004), the present process is terminated.

In the step S1005, the CPU 206 acquires the start time of the registered record indicated by the record pointer from the start time management column 701 of the pause filler-appearing section management table 700.

Then, in a step S1006, the CPU 206 acquires the end time of the registered record indicated by the record pointer from the end time management column 702 of the pause filler-appearing section management table 700. After that, the CPU 206 increments the record pointer of the pause filler-appearing section management table 700 and then proceeds to a step S1007.

In the step S1007, the CPU 206 identifies a section (time section), in which the pause filler corresponding to the registered record indicated by the record pointer before being incremented appears, from the timeline of the moving image data 400, based on the start time and the end time, read in the steps S1005 and S1006, respectively. Then, the CPU 206 performs the muting 605 with respect to the identified section of the sound record 402, in which the pause filler appears, and then outputs (updates) the moving image data 600 to the HDD 209 of the information processing server 103. Then, the CPU 206 returns to the step S1004.

Next, a second embodiment as one of the preferred embodiments of the present disclosure will be described with reference to drawings. Note that the hardware configuration of the present embodiment is the same as that of the first embodiment, and hence the same components are denoted by the same reference numerals, and redundant description thereof is omitted.

Figure 11:
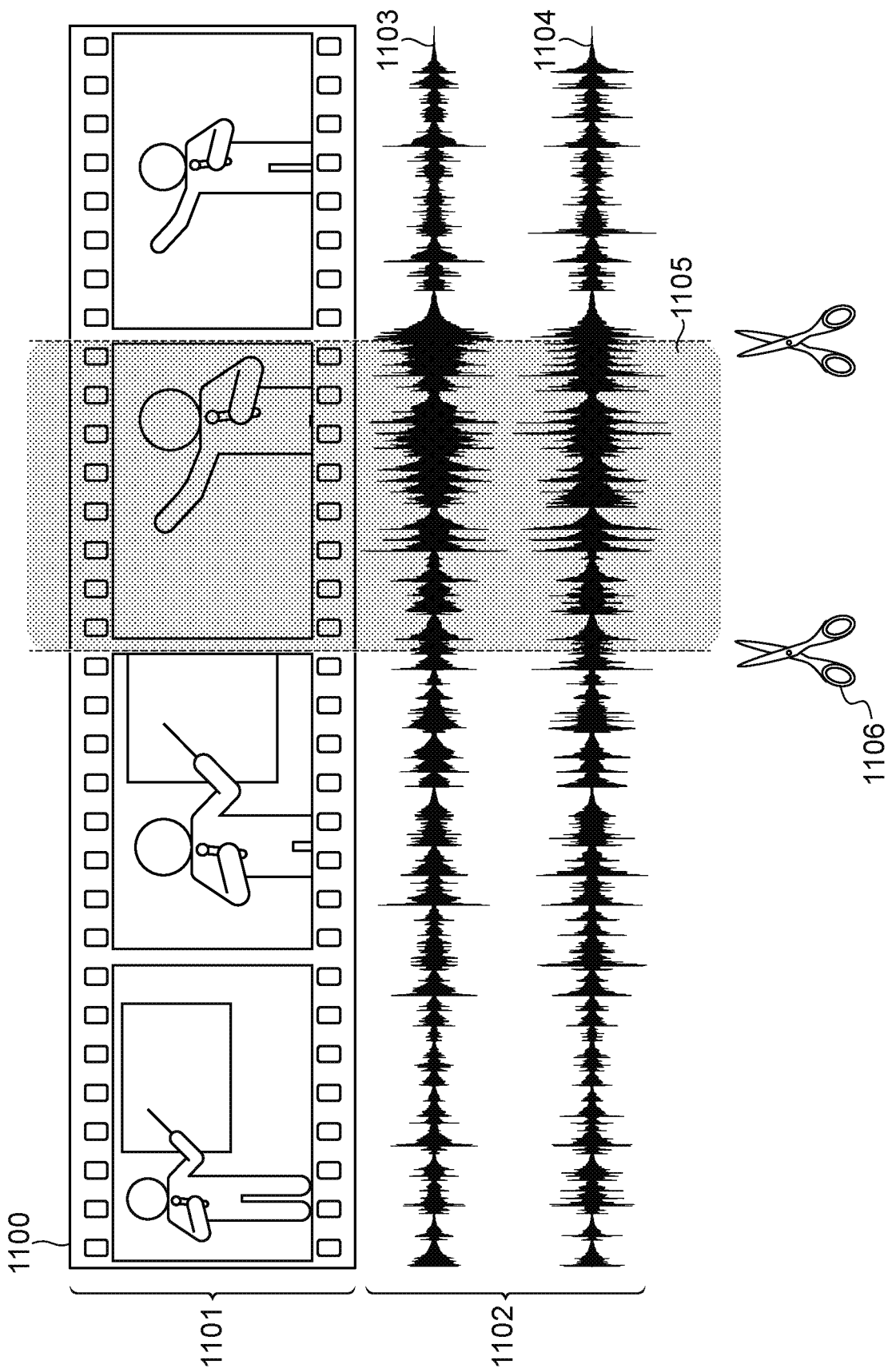
FIG. 11 is a diagram showing moving image data obtained by deletion of pause fillers, according to a second embodiment of the present disclosure, which is executed by the information processing server.

FIG. 11 is a diagram showing moving image data 1100 obtained after deletion of pause fillers, according to the present embodiment, executed by the information processing server 103.

A moving image-editing process, described hereinafter with reference to FIG. 13, according to the present embodiment, is performed by the information processing server 103 on the moving image data 1100 to be processed. In this moving image-editing process, scene cutting 1106 for deleting both of a video record 1101 and a sound record 1102 is performed with respect to a pause filler-appearing section 1105 in which a pause filler registered in the pause filler management table 500 was uttered. Note that reference numerals 1103 and 1104 indicate a plurality of channels, respectively.

Figure 12:
FIG. 12 is a diagram showing a pause filler-appearing section management table according to the second embodiment, which holds results of sound information analysis performed for each moving image by the information processing server.

FIG. 12 is a diagram showing a pause filler-appearing section management table 1200 according to the present embodiment, which holds results of sound information analysis performed on a moving image-by-moving image basis, by the information processing server 103. In the pause filler-appearing section management table 1200, a registered record is recorded for each section, in which a pause filler was uttered, of the moving image to be processed.

Referring to FIG. 12, the pause filler-appearing section management table 1200 is formed by a start time management column 1201, an end time management column 1202, an utterance ID management column 1203, and a processing management column 1204.

The start time management column 1201 records an elapsed time of moving image reproduction (indicating a start time) at which a section is started in which a specific pause filler was uttered in the voice data of the moving image to be processed.

The end time management column 1202 records an elapsed time of moving image reproduction (indicating an end time) at which the section is ended in which the specific pause filler was uttered in the sound data of the moving image to be processed. The section to be processed is identified by the start time managed in the start time management column 1201 and the end time managed in the end time management column 1202.

Note that in the end time management column 1202, a time difference between the start time and the end time can be recorded.

The utterance ID management column 1203 records the utterance ID 501 of a pause filler in a section in which the pause filler was uttered. The processing management column 1204 records processing to be performed on a pause filler appearing in a section to be processed. In the present embodiment, not only muting, described in the first embodiment, but also scene cutting 1106, described with reference to FIG. 11, are recorded as processing for deleting a pause filler. Note that the processing management column 1204 can record "non-processing" in which neither muting nor scene cutting is performed, according to characteristics of a section to be processed.

Figure 13:
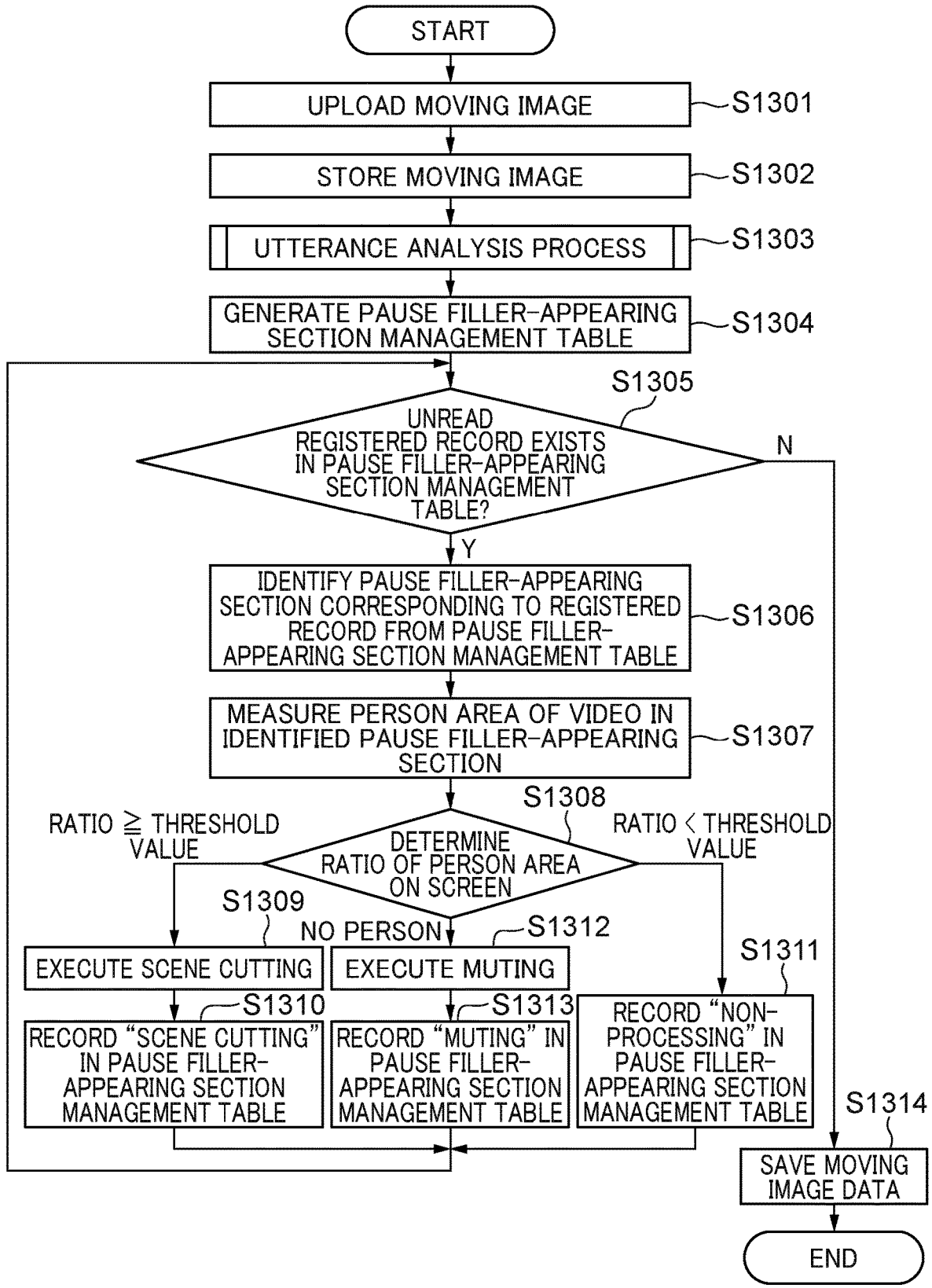
FIG. 13 is a flowchart of a moving image-editing process according to the second embodiment, which is performed by the information processing server.

FIG. 13 is a flowchart of the moving image-editing process according to the present embodiment, which is performed by the information processing server 103. The present process is executed by the CPU 206 of the information processing server 103 loading a program stored in the ROM 207 into the RAM 208.

In a step S1301, when the CPU 206 detects that the moving image data 1100 has been uploaded to the information processing server 103 directly from the image capturing apparatus 101 or via the information processing apparatus 102, the CPU 206 proceeds to a step S1302.

In the step S1302, the CPU 206 stores the moving image data 1100 uploaded in the step S1301 in the RAM 208 or the HDD 209 of the information processing server 103.

In a step S1303, the CPU 206 executes the utterance analysis process described hereinabove with reference to FIG. 9, in which the CPU 206 performs sound analysis on the sound record 1102 of the moving image data 1100 stored in the step S1302, converts contents of an utterance into text, and identifies a pause filler managed in the pause filler management column 502C. Note that the contents of utterances converted into text and a list of pause filler-appearing sections, which have been obtained by executing the utterance analysis process, can be output as a file.

In a step S1304, the CPU 206 generates the pause filler-appearing section management table 1200, described hereinabove with reference to FIG. 12, from the list of the pause filler-appearing sections, obtained by the utterance analysis process in the step S1303.

In a step S1305, the CPU 206 checks whether or not there is an unread registered record indicated by a record pointer of the pause filler-appearing section management table 1200, which is generated in the step S1304. If there is an unread registered record (YES to the step S1305), the CPU 206 proceeds to a step S1306. On the other hand, if there is no unread registered record (NO to the step S1305), the process proceeds to a step S1314.

In the step S1306, the CPU 206 reads the start time of the registered record indicated by the record pointer from the start time management column 1201 of the pause filler-appearing section management table 1200. Similarly, the CPU 206 reads the end time of the registered record indicated by the record pointer from the end time management column 1202 of the pause filler-appearing section management table 1200. Next, the CPU 206 identifies a section (time section) in which the pause filler corresponding to the registered record indicated by the record pointer appears, from the timeline of the moving image data 1100.

In a step S1307, the CPU 206 reads a video area of the section in which the pause filler appears, which is identified in the step S1306, from the moving image data 1100 stored in the step S1302. Next, the CPU 206 calculates a ratio of the area of a person on the screen to the read video area. Note that the CPU 206 (identifying unit/associating unit) can detect a position of a mouth of the person on the screen in the read video area, identify the speaker of the pause filler from the motion of the mouth, and record the identified speaker in association with the pause filler-appearing section. Further, the CPU 206 (detection unit) can detect and record a signal S/N ratio between voice uttered by the person and peripheral environmental sound in the pause filler-appearing section identified in the step S1306 in the moving image data 1100 stored in the step S1302.

In a step S1308, the CPU 206 determines whether or not the ratio of the area of the person on the screen to the read video area, which is calculated in the step S1307, is equal to or larger than a predetermined threshold value. If the calculated ratio of the area of the person on the screen to the read video area is equal to or larger than the predetermined threshold value, the moving image data 1100 is assumed to be a moving image in which an image of the speaker is captured as a main object, such as a moving image photographing a person who is performing presentation, for example. Therefore, in this case, the CPU 206 determines that scene cutting is required and proceeds to a step S1309. This is because, in a moving image in which an image of the speaker is captured as the main object, the voice is a main subject, and even when the whole scene including unnecessary voice is cut off, a feeling of strangeness is less. Note that even in a case where the pause filler-appearing section identified in the step S1306 corresponds to a scene in which a speaker of the pause filler is identified from the motion of the mouth of the person on the screen, the CPU 206 can similarly determine that scene cutting is required and proceed to the step S1309.

In the step S1309, the CPU 206 (scene cutting unit) executes scene cutting for deleting the whole section including the video information and sound information corresponding to the pause filler-appearing section identified in the step S1306.

Then, in a step S1310, the CPU 206 records scene cutting, as processing performed on the pause filler of the registered record indicated by the record pointer, in the processing management column 1204 of the pause filler-appearing section management table 1200. Then, the CPU 206 returns to the step S1305.

On one hand, if it is determined in the step S1308 that the ratio of the area of the person on the screen to the read video area, which is calculated in the step S1307, is smaller than the predetermined threshold value, it is presumed that the moving image data 1100 is a moving image in which both of video and sound including environmental sound are related to each other, such as a moving image formed by shooting a meeting or a moving image formed by shooting on location in town. Therefore, in this case, the CPU 206 determines that it is preferable not to perform deletion of pause filler and proceeds to a step S1311 without executing step S1309. Note that in a case where the S/N ratio between the voice uttered by the person and the environmental sound is calculated in the step S1307, and the calculated S/N ratio is lower than a threshold value, the CPU 206 can also determine that it is preferable not to delete the pause filler and proceed to the step S1311 without executing step S1309.

In the step S1311 following the step S1308, the CPU 206 records "non-processing" as processing to be performed on the registered record indicated by the record pointer, in the processing management column 1204 of the pause filler-appearing section management table 1200. Then, the CPU 206 returns to the step S1305.

On the other hand, if, in the step S1307, the speaker of the pause filler is not detected on the screen, the determination in the step S1308 is "no person", so that the moving image data 1100 is assumed to be, for example, a moving image formed by recording a narration voice on a scenery video. Therefore, the CPU 206 determines that muting is required and proceeds to a step S1312. This is because, in a video in which a narration voice is recorded on a scenery video, the video is a main subject, and a feeling of strangeness is less even if the sound is interrupted, but on the other hand, a feeling of strangeness is large if the video is interrupted.

In the step S1312, the CPU 206 deletes the sound signals corresponding to the pause filler-appearing section identified in the step S1306 from the moving image data 1100 to mute the sound in this section.

Then, in a step S1313, the CPU 206 records muting as processing performed on the pause filler of the registered record indicated by the record pointer, in the processing management column 1204 of the pause filler-appearing section management table 1200. Then, the CPU 206 returns to the step S1305.

In the step S1314, the CPU 206 saves edited moving image data generated by deleting the pause fillers from the moving image data 1100, in the RAM 208 or the HDD 209 of the information processing server 103. Further, at the same time, the CPU 206 (display instruction unit) transmits the moving image data from which the pause fillers have been deleted, information on the pause filler-appearing section management table 1200 (pause filler-appearing section management information), and a UI display instruction, to the information processing apparatus 102 (external apparatus/display apparatus). After that, the CPU 206 terminates the present process. In the information processing apparatus 102, a UI screen 1400, described hereinafter with reference to FIG. 14, is displayed on a display 201a (display unit) according to the UI display instruction from the information processing server 103.

Figure 14:
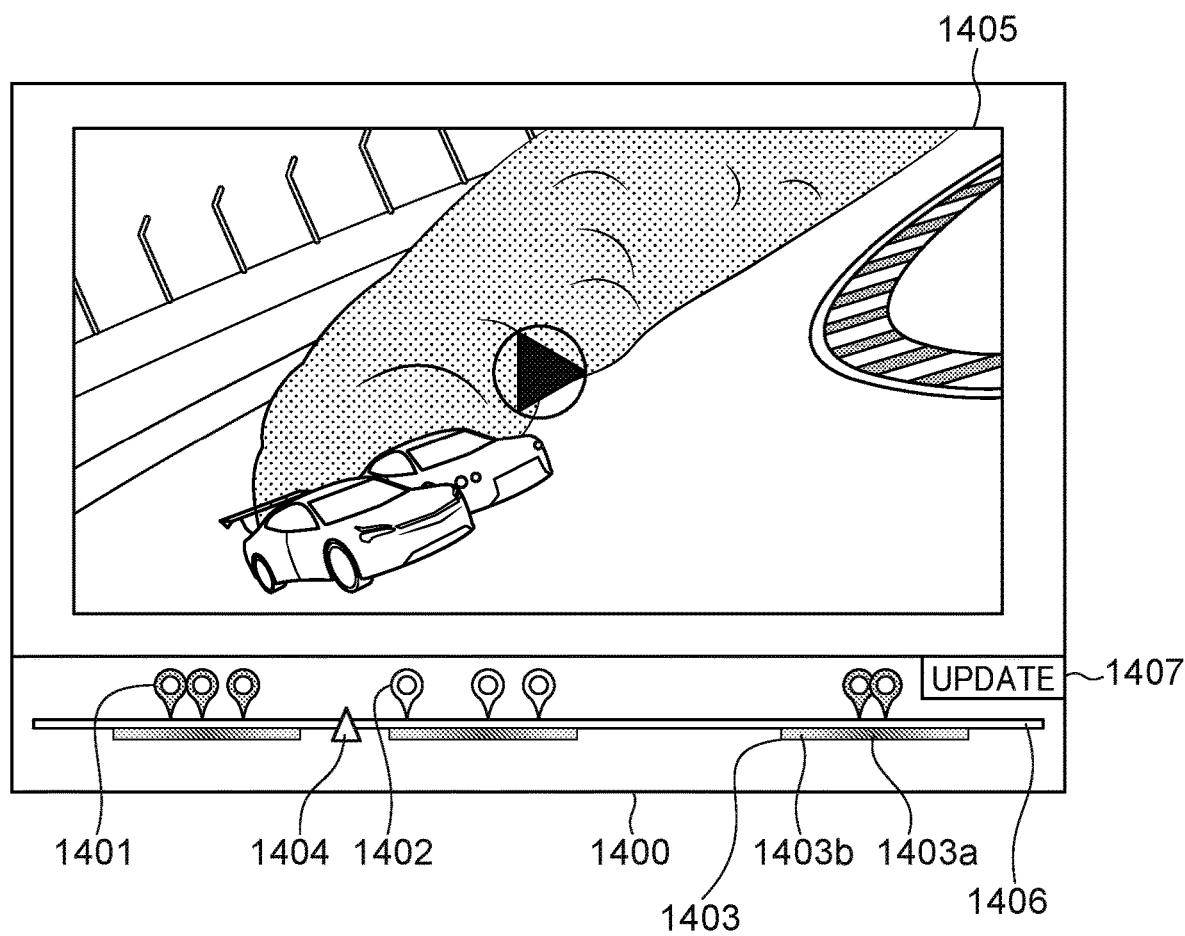
FIG. 14 is a diagram showing a user interface (UI) screen according to the second embodiment, which is displayed on the information processing apparatus.

FIG. 14 is a diagram showing the UI screen 1400 according to the present embodiment.

Referring to FIG. 14, the UI screen 1400 has a muting pin mark 1401, a scene cutting pin mark 1402, an unnecessary utterance frequency bar 1403, a slider 1404, a moving image reproduction section 1405, a seek bar 1406, and an update button 1407.

The muting pin mark 1401 (marker) is a pin mark indicating a section on the timeline of the moving image, indicated by the seek bar 1406, on which muting has been performed, and is displayed above the seek bar 1406.

The scene cutting pin mark 1402 (marker) is a pin mark indicating a section on the timeline of the moving image, indicated by the seek bar 1406, on which scene cutting has been performed, and is displayed above the seek bar 1406.

The unnecessary utterance frequency bar 1403 is a bar expressing the unnecessary utterance frequency on the timeline, indicated by the seek bar 1406, of the moving image, in color gradation varying with time, as illustrated in a duration 1403a higher in frequency and a duration 1403b lower in frequency which vary in color gradation.

The slider 1404 is arranged on the seek bar 1406 and indicates which section of the video on the timeline of the moving image is being reproduced on the moving image reproduction section 1405.

When the user selects the muting pin mark 1401 or the scene cutting pin mark 1402 and deletes the selected pin mark by operating a PD 205a, the user can change the processing to be performed on the target pause filler-appearing section to "non-processing". Further, the user can change the type of the selected pin mark, for example, from the muting pin mark to the scene cutting pin mark. Further, the user can newly add the muting pin mark 1401 or the scene cutting pin mark 1402 at a desired position on the seek bar 1406 by operating the PD 205a to newly set a pause filler-appearing section.

When the user selects the update button 1407 by operating the PD 205a, the CPU 206a (update unit) of the information processing apparatus 102 updates the information on the pause filler-appearing section management table 1200 according to deletion, addition, or change of a pin mark on the UI screen 1400. After that, the CPU 206a (updated information transmission unit) transmits the information on the updated pause filler-appearing section management table 1200 to the information processing server 103.

When the CPU 206 of the information processing server 103 receives the information on the updated pause filler-appearing section management table 1200 from the information processing apparatus 102, the CPU 206 executes re-editing of the moving image data 1100 based on the received information. The CPU 206 saves the re-edited moving image data in the RAM 208 or the HDD 209 of the information processing server 103. Further, at the same time, the CPU 206 transmits the re-edited moving image data and a UI display update instruction to the information processing apparatus 102. The CPU 206a of the information processing apparatus 102 updates the UI screen 1400 (in FIG. 14) displayed on the display 201a according to the UI display update instruction from the information processing server 103.

That is, the user can easily correct a result of the moving image-editing process, described hereinabove with reference to FIG. 13, which is executed by the information processing server 103, while checking the positions of the muting pin marks 1401 and the scene cutting pin marks 1402, and the positions of the unnecessary utterance frequency bars 1403 on the seek bar 1406. With this, it is possible to contribute to improvement of the efficiency of the moving image-editing operation of a user.

To realize the processing of functions of the present disclosure on a computer, the program code itself supplied to and installed in the computer also realizes the present disclosure. That is, the computer program itself for realizing the processing of functions of the present disclosure is also included in the present disclosure.

In this case, any program form, such as an object code, a program executed by an interpreter, and script data supplied to an OS, can be employed insofar as it has the function of a program.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-067278 filed Apr. 17, 2023, which is hereby incorporated by reference herein in its entirety.

What is claimed is:

1. An information processing apparatus comprising:
at least one memory storing instructions; and
at least one processor that, upon execution of the stored instructions, is caused to:
acquire a moving image including sound information;
analyze the sound information of the acquired moving image to identify a presence of an utterance by a speaker in the acquired moving image;
determine, based on a result of the analysis of the sound information and a predefined set of pause filler information, that the utterance present in the moving image includes a meaningless utterance representing a pause filler sound that is uttered by the speaker;
acquire a section of the moving image having the sound information that corresponds to the determined meaningless utterance;
detect the speaker within the moving image in the section including the determined meaningless utterance; and
execute editing that removes sound information from the moving image corresponding to at least the determined meaningless utterance from the moving image with respect to the section including the meaningless utterance, according to a result of the detection.

2. The information processing apparatus according to claim 1, wherein execution of the stored instructions further causes the at least one processor to execute, as part of the removal of sound information, muting processing for muting the sound information with respect to the acquired sectionof the moving image.

3. The information processing apparatus according to claim 1, wherein execution of the stored instructions further causes the at least one processor to execute, as part of the removal of sound information, scene cutting processing for deleting the sound information and video information of the moving image with respect to the acquired sectionof the moving image.

4. The information processing apparatus according to claim 3, wherein execution of the stored instructions further causes the at least one processor to execute the scene cutting processing when it is determined that a ratio of an area of a person detected within the acquired section of the moving image that includes the meaningless utterance is equal to or larger than a threshold value.

5. The information processing apparatus according to claim 1, wherein execution of the stored instructions further causes the at least one processor to not executing removal of sound information from the moving image when the speaker has not been detected within the moving image in the acquired section that includes the meaningless utterance.

6. The information processing apparatus according to claim 3, wherein execution of the stored instructions further causes the at least one processor to detection unit detects
detect the speaker based on motion of a mouth of a person within the moving image in the acquired section of the moving image that includes the meaningless utterance;
associate the acquired section of the moving image including the meaningless utterance with the speaker, and
executing the scene cutting processing on the acquired section of the moving image including the meaningless utterance and the speaker being associated with each other.

7. The information processing apparatus according to claim 1, execution of the stored instructions further causes the at least one processor to detect a signal-to-noise (S/N) ratio between voice uttered by the speaker and environmental sound from the sound information of the moving image, and
wherein the editing that removes the sound information that includes at least the meaningless utterance is not executed when detected S/N ratio is lower than a threshold value.

8. The information processing apparatus according to claim 1, wherein execution of the stored instructions further causes the at least one processor to transmit, to an external apparatus, display instruction information that instructs the external apparatus to display the moving image generated based on the executed editing processing.

9. The information processing apparatus according to claim 8, wherein execution of the stored instructions further causes the at least one processor to transmit, with the display instruction information, the acquired section of the moving image including the meaningless utterance and section management information to the external apparatus, wherein the section management information is used for removing the sound information including at least the meaningless utterance.

10. An information processing system including:
an image capturing apparatus that captures a moving image including sound information;
an external apparatus in communication with a display apparatus including a display; and
an information processing apparatus that edits the captured moving image
the information processing apparatus comprising at least one memory storing instructions; and at least one processor that, upon execution of the stored instructions, is caused to:
acquire a moving image including sound information;
analyze the sound information of the acquired moving image to identify a presence of an utterance by a speaker in the acquired moving image;
determine, based on a result of the analysis of the sound information and a predefined set of pause filler information, that the utterance present in the moving image includes a meaningless utterance representing a pause filler sound that is uttered by the speaker;
acquire a section of the moving image having the sound information that corresponds to the determined meaningless utterance;

detect the speaker within the moving image in the section including the meaningless utterance; and execute editing that removes sound information from the moving image corresponding to at least the determined meaningless utterance from the moving image with respect to the section including the meaningless utterance, according to a result of the detection; and instruct, after the moving image has been edited the external apparatus to display the edited moving image on the display of the display apparatus according to the display instruction.

11. A method of controlling an information processing apparatus, comprising:

acquiring a moving image including sound information;

analyzing sound information of the acquired moving image to identify a presence of an utterance by a speaker in the acquired moving image;

determining, based on a result of the analysis of the sound information and a predefined set of pause filler information, that the utterance present in the moving image is a meaningless utterance representing a pause filler that is uttered by the speaker;

acquiring a section of the moving image having the sound information that corresponds to the determined meaningless utterance;

detecting the speaker within the moving image in the section including the determined meaningless utterance; and executing editing that removes sound information from the moving image corresponding to at least the determined meaningless utterance from the moving image with respect to the section including the meaningless utterance, according to a result of the detection.

12. A method of controlling an information processing system including an image capturing apparatus that captures a moving image including sound information, an information processing apparatus that edits the captured moving image, and an external apparatus in communication with a display apparatus including a display, comprising:

in the information processing apparatus, analyzing sound information of the acquired moving image to identify a presence of an utterance by a speaker in the acquired moving image;

determining, based on a result of the analysis of the sound information and a predefined set of pause filler information, that the utterance present in the moving image is a meaningless utterance representing a pause filler that is uttered by the speaker;

acquiring a section of the moving image having the sound information that corresponds to the determined meaningless utterance;

detecting the speaker within the moving image in the section including the determined meaningless utterance; and executing editing that removes sound information from the moving image corresponding to at least the determined meaningless utterance from the moving image with respect to the section including the meaningless utterance, according to a result of the detection; and instructing, after the moving image has been edited, the external apparatus to display the edited moving image, and in the display apparatus, displaying, on the display, the edited moving image according to the instruction.

13. A non-transitory computer-readable storage medium storing a program for causing a computer to execute a method of controlling an information processing apparatus, wherein the method comprises:

acquiring a moving image including sound information;

analyzing sound information of the acquired moving image to identify a presence of an utterance by a speaker in the acquired moving image;

determining, based on a result of the analysis of the sound information and a predefined set of pause filler information, that the utterance present in the moving image is a meaningless utterance representing a pause filler that is uttered by the speaker;

acquiring a section of the moving image having the sound information that corresponds to the determined meaningless utterance;

detecting the speaker within the moving image in the section including the determined meaningless utterance; and executing editing that removes sound information from the moving image corresponding to at least the determined meaningless utterance from the moving image with respect to the section including the meaningless utterance, according to a result of the detection.

14. A non-transitory computer-readable storage medium storing a program for causing a computer to execute a method of controlling an information processing system including an image capturing apparatus that captures a moving image including sound information, an information processing apparatus that edits the captured moving image, and an external apparatus in communication with a display apparatus including a display, wherein the method comprises:

in the information processing apparatus, analyzing sound information of the acquired moving image to identify a presence of an utterance by a speaker in the acquired moving image;

determining, based on a result of the analysis of the sound information and a predefined set of pause filler information, that the utterance present in the moving image is a meaningless utterance representing a pause filler that is uttered by the speaker;

acquiring a section of the moving image having the sound information that corresponds to the determined meaningless utterance;

detecting the speaker within the moving image in the section including the determined meaningless utterance; and executing editing that removes sound information from the moving image corresponding to at least the determined meaningless utterance from the moving image with respect to the section including the meaningless utterance, according to a result of the detection; and instructing, after the moving image has been edited, the external apparatus to display the edited moving image, and in the display apparatus, displaying, on the display, the edited moving image according to the instruction.

* * * * *